United States Patent
Choi et al.

(10) Patent No.: US 9,513,733 B2
(45) Date of Patent: Dec. 6, 2016

(54) ORGANIC LIGHT EMITTING DIODE DISPLAY DEVICE INCLUDING TOUCH PANEL

(71) Applicant: LG Display Co., Ltd., Seoul (KR)

(72) Inventors: Bong-Ki Choi, Goyang-si (KR); Sang-Kyu Lee, Daejeon (KR)

(73) Assignee: LG DISPLAY CO., LTD., Seoul (KR)

( * ) Notice: Subject to any disclaimer, the term of this patent is extended or adjusted under 35 U.S.C. 154(b) by 76 days.

(21) Appl. No.: 14/095,363

(22) Filed: Dec. 3, 2013

(65) Prior Publication Data

US 2014/0160047 A1 Jun. 12, 2014

(30) Foreign Application Priority Data

Dec. 7, 2012 (KR) .................. 10-2012-0141701

(51) Int. Cl.
*G06F 3/041* (2006.01)
*G06F 3/044* (2006.01)
*G09G 3/32* (2016.01)
*G06F 3/042* (2006.01)

(52) U.S. Cl.
CPC ............ *G06F 3/0412* (2013.01); *G06F 3/042* (2013.01); *G06F 3/044* (2013.01); *G06F 3/0421* (2013.01); *G09G 3/3208* (2013.01); *G06F 2203/04109* (2013.01); *G09G 2300/0426* (2013.01)

(58) Field of Classification Search
CPC .... G06F 3/041; G06F 3/0412; G06F 3/0416; G06F 3/044; G06F 2203/04105; G06F 2203/04107; G06F 2203/04111; G09G 3/32–3/3258; G09G 2300/0421; G09G 2300/0426; H01L 27/3248–27/3253; H01L 27/3276; H01L 27/3279; H01L 27/3288; H01L 27/329

See application file for complete search history.

(56) References Cited

U.S. PATENT DOCUMENTS

| | | | |
|---|---|---|---|
| 2009/0309850 A1* | 12/2009 | Yang ................ | G06F 3/044 345/174 |
| 2010/0110040 A1* | 5/2010 | Kim et al. ............. | 345/174 |
| 2011/0037729 A1* | 2/2011 | Cho et al. ............. | 345/175 |
| 2013/0271388 A1* | 10/2013 | Chu et al. ............. | 345/173 |
| 2014/0049522 A1* | 2/2014 | Mathew ................ | G06F 3/041 345/82 |

FOREIGN PATENT DOCUMENTS

| | | |
|---|---|---|
| CN | 102004344 A | 4/2011 |
| CN | 102299166 A | 12/2011 |
| JP | 2004-253303 A | 9/2004 |

* cited by examiner

*Primary Examiner* — Nathan Danielsen
(74) *Attorney, Agent, or Firm* — Dentons US LLP (57) ABSTRACT

Disclosed is an organic light emitting diode (OLED) display device which includes an OLED array formed on a lower substrate; a touch panel attached to the lower substrate and including first and second sensor electrodes for sensing a touch and a routing line electrically connected to at least one of the first and second sensor electrodes and exposed to an upper surface of the touch panel; and a connection line electrically connecting the OLED array and the touch panel through an exposed portion of the routing line.

18 Claims, 5 Drawing Sheets

FIG.1A

Related Art

FIG.1B

Related Art

FIG.2A

Related Art

FIG.2B

Related Art

FIG.2C

Related Art

ORGANIC LIGHT EMITTING DIODE DISPLAY DEVICE INCLUDING TOUCH PANEL

This application claims the benefit of Korean Patent Application No. 10-2012-0141701, filed on Dec. 7, 2012, which is hereby incorporated by reference for all purposes as if fully set forth herein.

BACKGROUND OF THE INVENTION

Field of the Invention

The present invention relates to an organic light emitting diode display device including a built-in touch panel, and more particularly, to an organic light emitting diode display device including a built-in touch panel in which a connection defect between the touch panel and an organic light emitting diode array may be prevented and a bezel region may be reduced.

Discussion of the Related Art

Recently, organic light emitting diode (OLED) display devices have received attention as next generation display devices. OLED display devices are self-emissive devices in which light is emitted from an organic emission layer due to recombination of electrons and holes. The OLED display devices have high luminance and low driving voltage, and may be manufactured to have an ultra-thin thickness. Also, demand for the addition, to such an OLED display device, of a touch panel for transmitting separate information by touching a portion of the touch panel with a hand or a separate input member is increasing.

In general, touch panels are classified into three types: an Add-On type, an On-Cell type, and an In-Cell type. The Add-On type touch panel is attached to an outer surface of the OLED display device. The On-Cell type touch panel is deposited on the OLED display device. And, the In-Cell type touch panel is formed inside the OLED display device.

Because the In-Cell type touch panel is integrated into an OLED display device, the thickness of the OLED display device having the built-in In-Cell type touch panel is smaller than that of an OLED display device having a built-in Add-On type or On-Cell type touch panel.

Figure 1A:
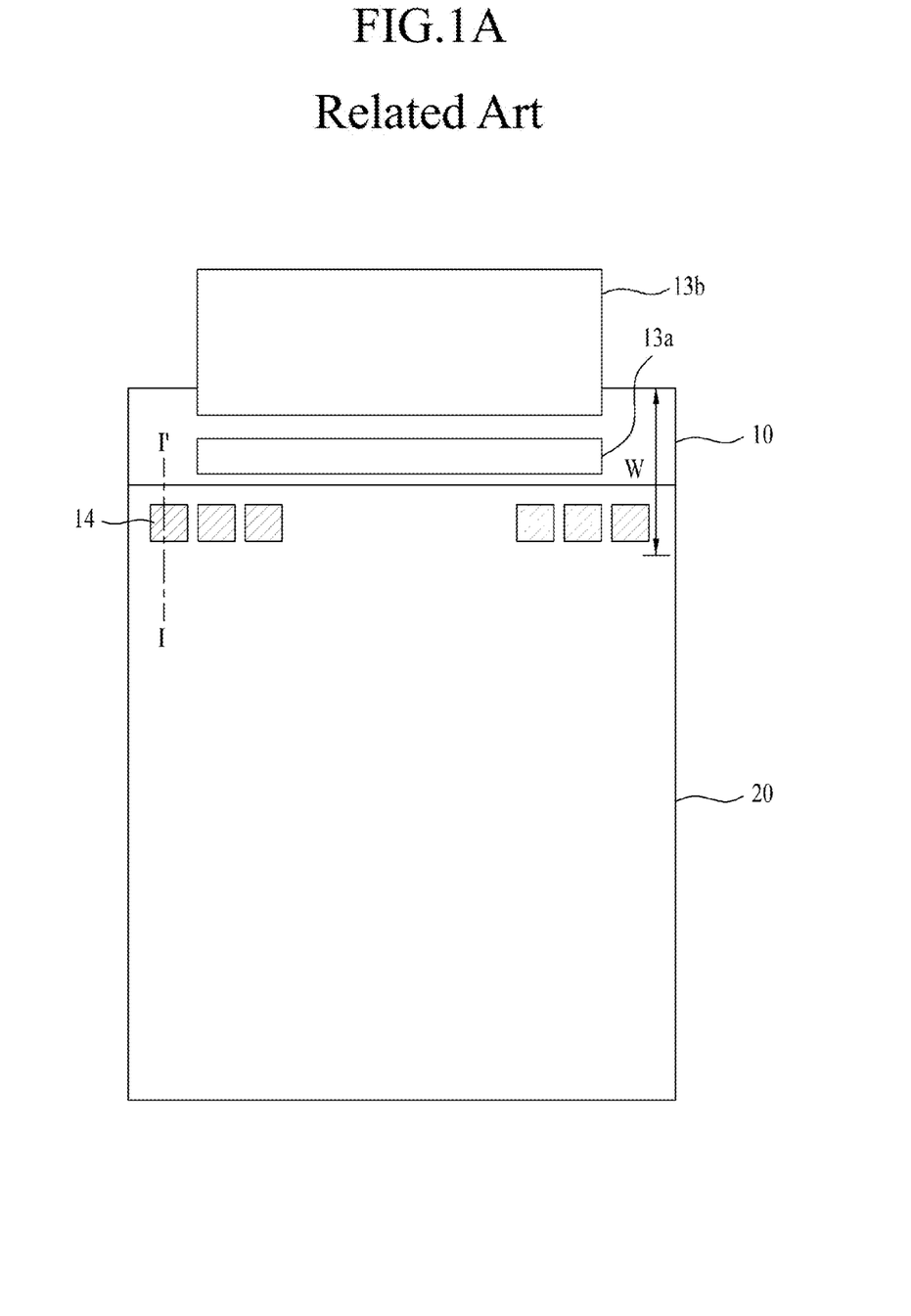
FIG. 1A is a plan view of an organic light emitting diode (OLED) display device including a built-in touch panel according to the related art.
Figure 1B:
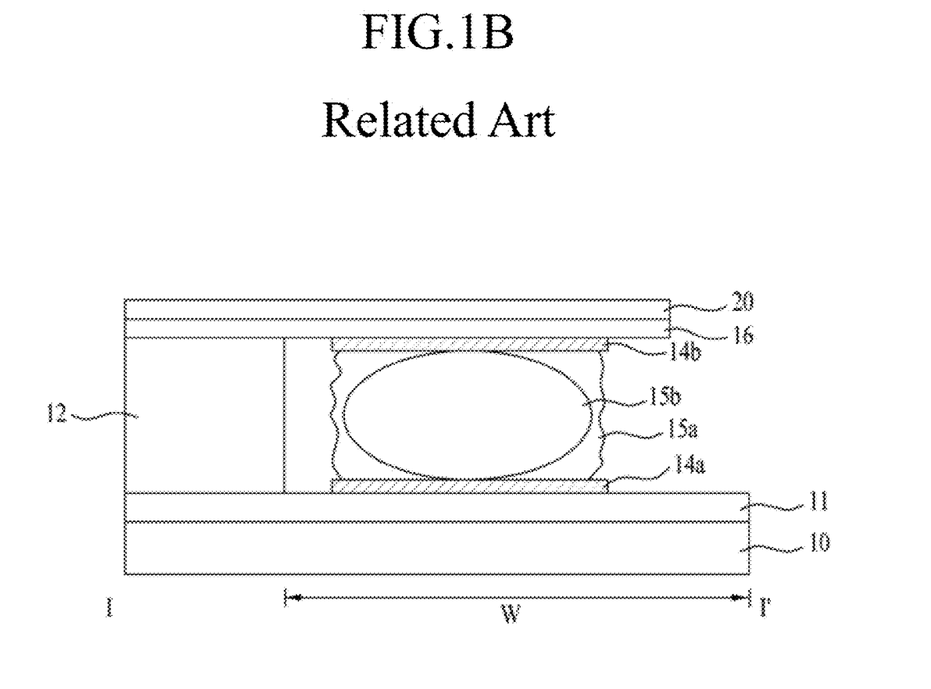
FIG. 1B is a sectional view taken along line I-I' of FIG. 1A.

FIG. 1A is a plan view of an OLED display device including a built-in touch panel according to the related art. FIG. 1B is a sectional view taken along line I-I' of FIG. 1A.

As shown in FIGS. 1A and 1B, an OLED display device including a built-in touch panel according to the related art includes a lower substrate 10 with an OLED array 11 formed thereon, an upper substrate 20 with a touch panel 16 formed thereon, and an adhesive agent 12 that adheres the upper substrate 20 to the lower substrate 10. In this regard, a touch signal applied to the touch panel 16 is applied to the OLED array 11 via a conductive ball 15b contained in a sealant 15a.

On the lower substrate 10 is formed the OLED array 11 including thin film transistors (TFTs) and OLEDs respectively connected to the TFTs. The OLED array 11 includes a lower connection pad 14a for receiving signals applied to the touch panel 16.

At one side of the lower substrate 10 is formed a drive IC 13a, and the drive IC 13a is connected to a flexible printed circuit board (FPCB) 13b. The FPCB 13b includes a timing control unit (not shown) for supplying various control signals to drive the OLED array 11, a power supply (not shown) for supplying a driving voltage, and the like. In addition, a signal of the FPCB 13b is applied to the OLED array 11 via the drive IC 13a.

On the upper substrate 20 is formed the touch panel 16 including first and second sensor electrodes (not shown), routing lines (not shown) connected to the first and second sensor electrodes (not shown), and upper connection pads 14b connected to ends of the routing lines (not shown). The conductive balls 15b contained in the sealant 15a are disposed between the upper connection pads 14b and the lower connection pads 14a.

In the related art OLED display devices having a built-in touch panel, a space for connecting the upper connection pad 14b to the lower connection pad 14a is, however, needed. Accordingly, a width W of the bezel region increases, which then reduces the display area.

Moreover, the lower substrate 10 with the OLED array 11 formed thereon generally has a greater area than that of the upper substrate 20 with the touch panel 16 formed thereon, and thus, the upper connection pad 14b, the lower connection pad 14a, and the sealant 15a are exposed to the outside. Accordingly, contact properties between the sealant 15a and the upper connection pad 14b and between the sealant 15a and the lower connection pad 14a are degraded.

Figure 2A:
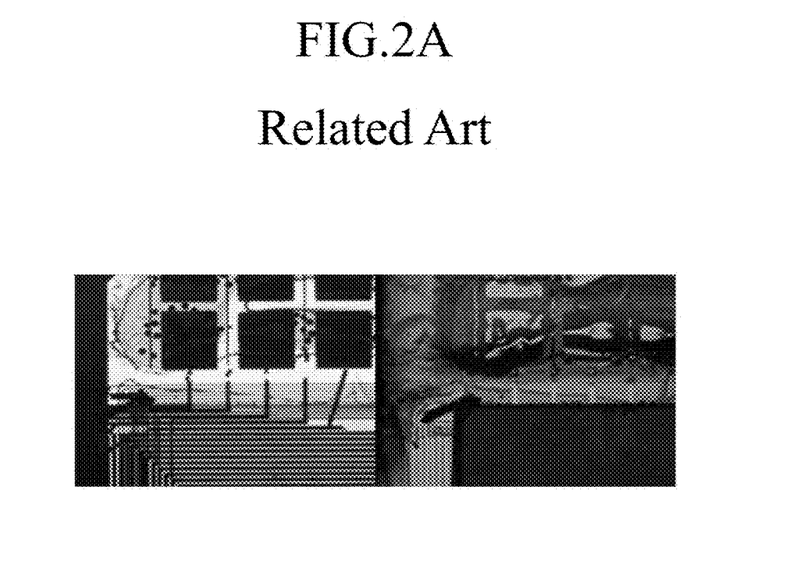
FIGS. 2A to 2C are images showing defects of the related art OLED display device having a built-in touch panel.
Figure 2B:
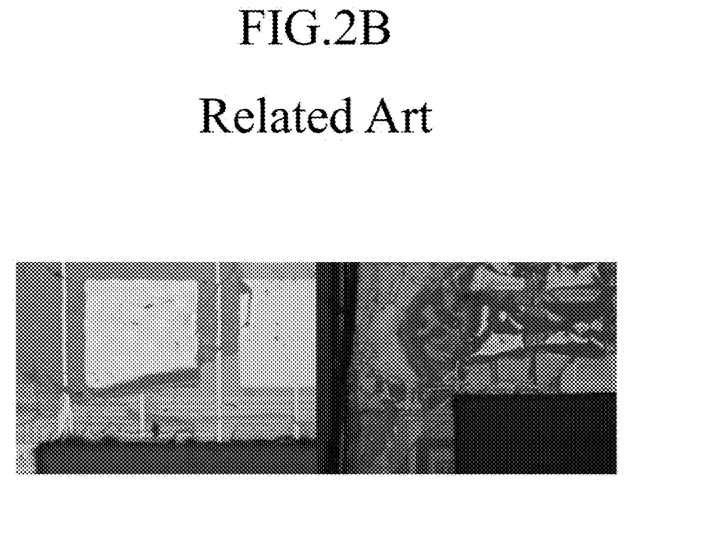
Figure 2C:
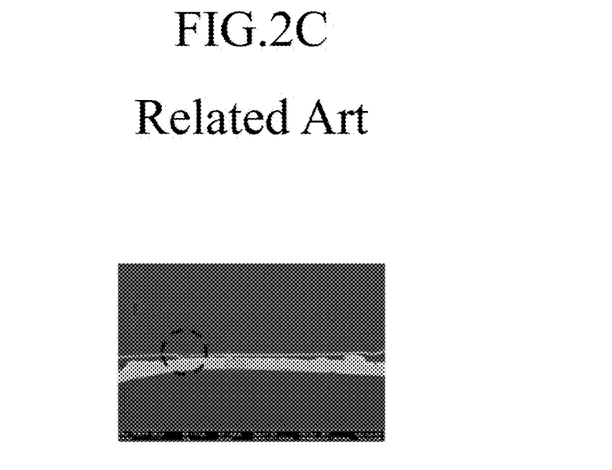

FIGS. 2A to 2C are images showing defects of the related art OLED display device having a built-in touch panel.

As described above, when the upper connection pad 14b, the lower connection pad 14a, and the sealant 15a are exposed to the outside, external moisture may permeate into the exposed region, and the conductive ball 15b and the sealant 15a may be separated from each other by external stress. Accordingly, disconnection of the routing lines occurs, as shown in FIG. 2A, or the upper and lower connection pads 14b and 14a are separated from the sealant 15a, as shown in FIG. 2B. Thus contact properties between the sealant 15a and the upper connection pad 14b and between the sealant 15a and the lower connection pad 14a are degraded. In addition, as shown in FIG. 2C, a crack is formed at the upper connection pad 14b and thus external moisture and oxygen permeate into the OLED display device via the crack, which results in deteriorated reliability of the OLED display device.

SUMMARY OF THE INVENTION

Accordingly, the present invention is directed to an organic light emitting diode display device including a touch panel that substantially obviates one or more problems due to limitations and disadvantages of the related art.

An advantage of the present invention is to provide an organic light emitting diode (OLED) display device including a built-in touch panel in which the touch panel and an OLED array are connected to each other using a connection line and thus connection properties therebetween are improved and a bezel region is decreased.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an organic light emitting diode (OLED) display device may include an OLED array formed on a lower substrate; a touch panel attached to the lower substrate and including first and second sensor electrodes for sensing a touch and a routing line electrically connected to at least one of the first and second sensor electrodes and exposed to an upper surface of the touch panel; and a connection line electrically connecting the OLED array and the touch panel through an exposed portion of the routing line.

The touch panel may include a support substrate with a connection hole through which the routing line is exposed, a routing line formed on the support substrate so as to cover the connection hole, a bridge electrode formed on the support substrate, a first insulating film formed so as to cover the bridge electrode, the first sensor electrode formed on the first insulating film and electrically connected to a portion of the bridge electrode, the portion being exposed by selectively removing the first insulating film, and the second sensor electrode formed on the first insulating film so as to intersect the first sensor electrode, and a second insulating film formed so as to cover the second sensor electrode.

The connection line may be connected to a flexible printed circuit board (FPCB) formed on the lower substrate and electrically connected to the OLED array. The FPCB may include a timing controller for supplying driving signals to the OLED array. The FPCB may be electrically connected to a driver IC that is formed on the lower substrate and electrically connected to the OLED array.

The connection line may include at least one metal selected from among silver (Ag), magnesium (Mg), aluminum (Al), platinum (Pt), gold (Au), nickel (Ni), neodymium (Nd), iridium (Ir), chromium (Cr), and copper (Cu).

The OLED display device may further include a passivation film attached to the upper surface of the touch panel so as to cover a region in which the connection line and the routing line are electrically connected to each other.

The exposed portion of the routing line may formed of a transparent conductive material. The routing line may include a first line formed of a low-resistance metal and a second line formed of the transparent conductive material. The bridge electrode may be formed of a transparent conductive material.

In another aspect of the present invention, a method of fabricating an organic light emitting diode (OLED) display device may, for example, include forming an OLED array formed on a lower substrate; forming a touch panel including first and second sensor electrodes for sensing a touch and a routing line electrically connected to at least one of the first and second sensor electrodes and exposed to an upper surface of the touch panel; and attaching the touch panel to the lower substrate and forming a connection line to electrically connect the OLED array and the touch panel through an exposed portion of the routing line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Hereinafter, an organic light emitting diode (OELD) display device including a built-in touch panel according to an embodiment of the present invention will be described in detail with reference to the accompanying drawings.

Figure 3A:
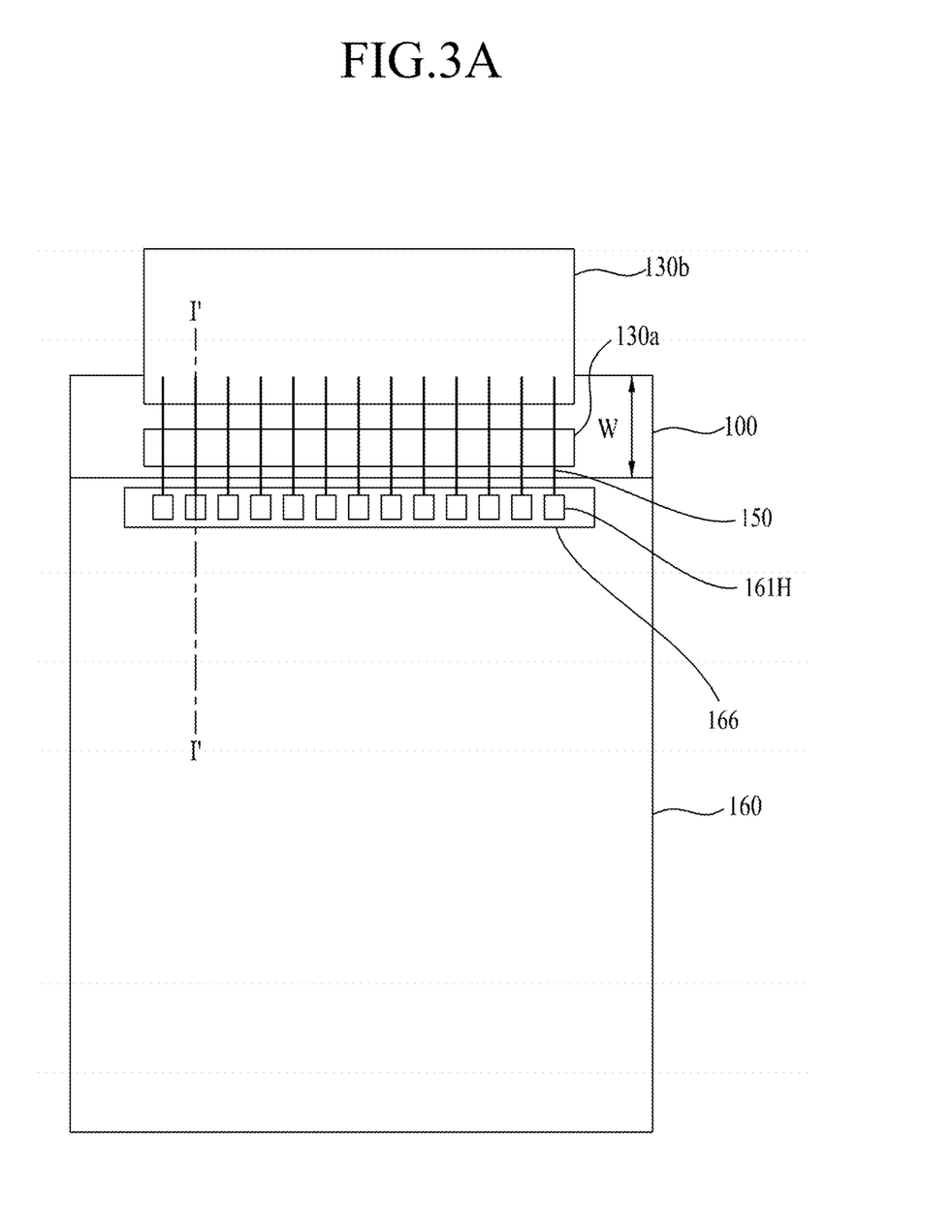
FIG. 3A is a plan view of an OLED display device including a built-in touch panel according to an embodiment of the present invention.
Figure 3B:
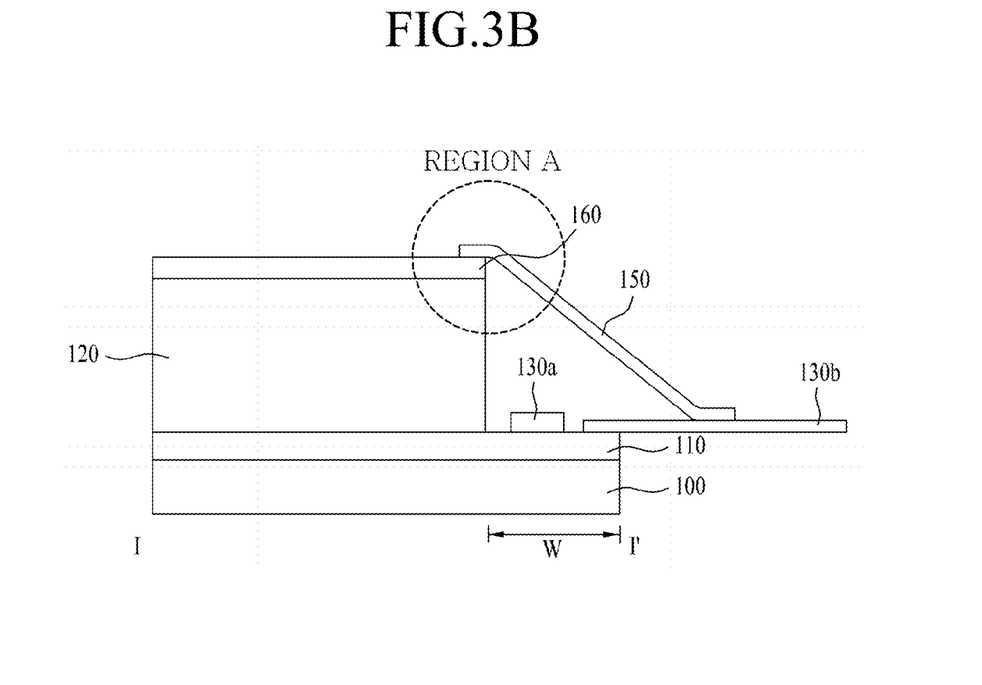
FIG. 3B is a sectional view taken along line I-I' of FIG. 3A.
Figure 3C:
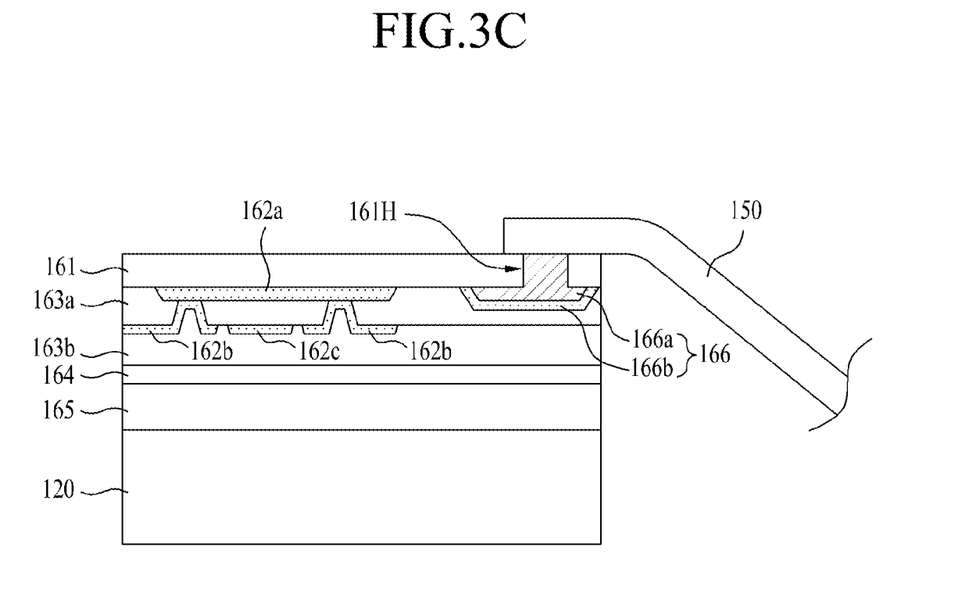
FIG. 3C is an enlarged view of region A of FIG. 3B.

FIG. 3A is a plan view of an OLED display device including a built-in touch panel according to an embodiment of the present invention. FIG. 3B is a sectional view taken along line I-I' of FIG. 3A. FIG. 3C is an enlarged view of region A of FIG. 3B.

As illustrated in FIGS. 3A and 3B, an OLED display device including a built-in touch panel according to the present invention is configured such that a lower substrate 100 with an OLED array 110 formed thereon is attached to a touch panel 160 using an adhesive agent 120. In this regard, a touch signal applied to the touch panel 160 is applied to the OLED array 110 via a connection line 150.

In particular, a plurality of gate lines and a plurality of data lines cross each other on the lower substrate 100 to define pixel regions. In addition, the OLED array 110 includes a thin film transistor (TFT) and an OLED connected to the TFT in each pixel region.

Although not shown, the TFT includes a switching TFT and a driving TFT. The switching TFT supplies, to the driving TFT, an image signal supplied to a data line in response to a scan pulse supplied to a gate line. The driving TFT controls an amount of current flowing in the OLED in each pixel in accordance with the image signal.

The OLED in each pixel includes a first electrode, an organic emission layer (EML), and a second electrode. In this regard, holes and electrons respectively injected to the first electrode and the second electrode are recombined to form excitons and thereby emit light. The organic EML may further include a hole injection layer (HIL), a hole transport layer (HTL), an EML, an electron transport layer (ETL), and an electron injection layer (EIL).

In addition, a drive IC 130$a$ is formed at one side of the lower substrate 100, and the drive IC 130$a$ is connected to a flexible printed circuit board (FPCB) 130$b$. The FPCB 130$b$ includes a timing control unit (not shown) for supplying various control signals to drive the OLED array 110, a power supply (not shown) for supplying a driving voltage, and the like. In addition, a signal of the FPCB 130$b$ is applied to the OLED array 110 via the drive IC 130$a$.

The touch panel 160 attached to the lower substrate 100 is connected to the OLED array 110 via the connection line 150. In this regard, a first end of the connection line 150 is connected to an upper surface of the touch panel 160 and a second end thereof is connected to the FPCB 130$b$ that is electrically connected to the OLED array 110.

In particular, as illustrated in FIG. 3C, the touch panel 160 includes a support substrate 161, a bridge electrode 162$a$ formed on the support substrate 161, first sensor electrodes 162b formed on a first insulating film 163a and respectively connected to portions of the bridge electrode 162a that are exposed by selectively removing the first insulating film 163a, a second sensor electrode 162c formed between the adjacent first sensor electrodes 162b so as to intersect the first sensor electrodes 162b, a second insulating film 163b formed so as to cover the first sensor electrodes 162b, routing lines 166 connected to the first and second sensor electrodes 162a and 162c, and a sensor layer 164 and a passivation layer 165 that are sequentially formed on the second insulating film 163b.

The bridge electrode 162a is formed in plural on the support substrate 161 in one direction to electrically connect the adjacent first sensor electrodes 162b. The bridge electrode 162a is formed of a transparent conductive material such as indium tin oxide (ITO), indium zinc oxide (IZO), indium tin zinc oxide (ITZO), or the like. In addition, the first and second insulating films 163a and 163b are formed of a transparent organic material.

On a front surface of the second insulating film 163b is formed the sensor layer 164 for sensing changes in capacitance generated when a human or a conductive body such as a stylus touches the support substrate 161. In addition, the passivation film 165 is formed on the sensor layer 164. The passivation layer 165 protects the OLED array 110 from pollutants such as moisture or gas when the touch panel 160 is attached to the OLED array 110 via the adhesive agent 120.

The routing lines 166 include first and second routing lines 166a and 166b. The first routing line 166a is formed of a low-resistance metal material, and the second routing line 166b is formed of a transparent conductive material as in the bridge electrode 162a.

The routing lines 166 are respectively connected to the first and second sensor electrodes 162b and 162c, and ends of the routing lines 166 are exposed to the outside of the support substrate 161 via connection holes 161H formed in the support substrate 161. In addition, the exposed portion of each routing line 166 is connected to the first end of the connection line 150 on the touch panel 160.

In the related art OLED display device having a built-in touch panel, the touch panel includes upper connection pads at ends of routing lines. In addition, a lower substrate also includes lower connection pads in a region corresponding to the upper connection pads. Thus, the upper and lower connection pads are connected to each other via conductive balls contained in a sealant and thus a signal applied to the touch panel is transmitted to an OLED array formed on the lower substrate.

In such a case, the upper and lower connection pads and the sealant are, however, exposed to the outside. In addition, contact properties between the sealant and each of the upper and lower connection pads are degraded due to external moisture and contact resistance thus increases. As such, disconnection of the routing lines may occur, and the upper and lower connection pads may be separated from the corresponding elements and contact properties between the sealant and each of the upper and lower connection pads may thus be degraded.

Moreover, in the related art OLED display device having a built-in touch panel, the bezel region increases to form the upper and lower connection pads connected to each other through the conductive balls. In addition, connection properties vary according to the sizes and types of the conductive balls and the viscosity of the sealant, and an additional process of curing the sealant is further required, which complicates the manufacturing process.

In an OLED display device having a built-in touch panel according to the present invention, upper and lower connection pads are, however, not required to be formed. Instead, the touch panel 160 is electrically connected to the OLED array 110 via the connection lines 150. In particular, the portion of each routing line 166 that is exposed via the upper surface of the touch panel 160 is connected to the first end of the connection line 150, and the second end of the connection line 150 is connected to the FPCB 130b that is electrically connected to the OLED array 110.

Thus, in an OLED display device having a built-in touch panel according to the present invention, because a region for forming upper and lower connection pads are not required, a width W of the bezel region may decrease and the display area may increase.

In addition, the routing lines 166 may be connected to the connection lines 150 on the upper surface of the touch panel 160. In this regard, the connection lines 150 are formed of at least one metal selected from among silver (Ag), magnesium (Mg), aluminum (Al), platinum (Pt), gold (Au), nickel (Ni), neodymium (Nd), iridium (Ir), chromium (Cr), copper (Cu), and the like.

Although not shown, a passivation film may be formed to the upper surface of the touch panel 160 so as to cover a region in which the routing lines 166 are connected to the connection lines 150.

Table 1 shows a defect rate of the related art OLED display device having a built-in touch panel, and Table 2 shows a defect rate of an OLED display device having a built-in touch panel according to the present invention.

TABLE 1

| | Disconnection of routing line | Separation of connection pad | Crack in connection pad | Other problems |
|---|---|---|---|---|
| First experiment | 14% | 12% | 5% | 3% |
| Second experiment | 10% | 13% | 8% | 1.3% |
| Third experiment | 7% | 10% | 4% | 2.5% |

In the related art OLED display device having a built-in touch panel, the upper connection pads formed on the touch panel are connected to the lower connection pads formed on the OLED array using the conductive balls contained in the sealant. In this case, however, as described above, the sealant is exposed to the outside and external moisture may thus permeate into the exposed region or the conductive balls and the sealant may be separated from each other by external stress. As shown in Table 1, a separation rate of the upper and lower connection pads is equal to or greater than 10% in the first, second and third experiments.

In addition, when the conductive balls are pressed by external impact, cracks may occur in the upper and lower connection pads connected to the conductive balls. Such cracks may extend to the routing lines and a disconnection rate of the routing lines may thus increase.

In an OLED display device having a built-in touch panel according to the present invention, the touch panel 160 is connected to the FPCB 130b electrically connected to the OLED array 110 via the connection lines 150, and thus, there is no need to form connection pads. As shown in Table 2, separation of connection pads and cracks in the connection pads do not occur, and the disconnection rate of the routing lines is significantly lower than that in the related art OLED display device having a built-in touch panel.

TABLE 2

|  | Disconnection of routing line | Separation of connection pad | Crack in connection pad | Other problems |
|---|---|---|---|---|
| First experiment | 2% | — | — | 2% |
| Second experiment | 1.8% | — | — | 2.1% |

Moreover, in the related art OLED display device having a built-in touch panel, the touch panel includes a passivation layer, a sensor layer, first and second sensor electrodes, and the like that are formed on an upper substrate, which is made of plastic such as polyimide (PI). In an OLED display device having a built-in touch panel according to the present invention, a stacking order of these elements of the touch panel 160 may be reversed, and the touch panel 160 may not include an upper substrate. Accordingly, an OLED display device having a built-in touch panel according to the present invention may have a decreased thickness.

In an OLED display device having a built-in touch panel according to the present invention, by electrically connecting the touch panel 160 and the OLED array 110 using the connection lines 150, connection properties may be improved, the bezel region may decrease, and the upper substrate may be omitted, which may result in a ultra-slim device.

An OLED display device having a built-in touch panel according to the present invention may have the following advantages.

First, the display area may be increased by not forming an upper connection pad on a touch panel and a lower connection pad on an OLED array.

Second, the touch panel may be connected to an FPCB that is electrically connected to the OLED array, whereby contact properties may be improved.

Third, a separate upper substrate may not be formed on the touch panel and thus the OLED display device having a built-in touch panel may have a decreased thickness.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An organic light emitting diode (OLED) display device comprising:
   an OLED array formed on a lower substrate;
   a touch panel attached to the lower substrate and including first and second sensor electrodes on a support substrate for sensing a touch and a routing line electrically connected to at least one of the first and second sensor electrodes and exposed to an upper surface of the support substrate of the touch panel through a connection hole in the support substrate of the touch panel; and
   a connection line electrically connecting the OLED array and the touch panel through an exposed portion of the routing line.

2. The OLED display device according to claim 1, wherein the touch panel further includes:
   a bridge electrode formed on the support substrate;
   a first insulating film formed so as to cover the bridge electrode;
   the first sensor electrode formed on the first insulating film and electrically connected to a portion of the bridge electrode, the portion being exposed by selectively removing the first insulating film, and the second sensor electrode formed on the first insulating film so as to cross the first sensor electrode; and
   a second insulating film formed so as to cover the second sensor electrode.

3. The OLED display device according to claim 1, wherein the connection line is connected to a flexible printed circuit board (FPCB) formed on the lower substrate and electrically connected to the OLED array.

4. The OLED display device according to claim 3, wherein the FPCB includes a timing controller for supplying driving signals to the OLED array.

5. The OLED display device according to claim 4, wherein the FPCB is electrically connected to a driver IC that is formed on the lower substrate and electrically connected to the OLED array.

6. The OLED display device according to claim 1, wherein the connection line includes at least one metal selected from among silver (Ag), magnesium (Mg), aluminum (Al), platinum (Pt), gold (Au), nickel (Ni), neodymium (Nd), iridium (Ir), chromium (Cr), and copper (Cu).

7. The OLED display device according to claim 1, further comprising a passivation film attached to the upper surface of the touch panel so as to cover a region in which the connection line and the routing line are electrically connected to each other.

8. The OLED display device according to claim 1, wherein the exposed portion of the routing line is formed of a transparent conductive material.

9. The OLED display device according to claim 8, wherein the routing line includes a first line formed of a low-resistance metal and a second line formed of the transparent conductive material.

10. A method of fabricating an organic light emitting diode (OLED) display device, the method comprising:
    forming an OLED array formed on a lower substrate;
    forming a touch panel including first and second sensor electrodes on a support substrate for sensing a touch and a routing line electrically connected to at least one of the first and second sensor electrodes and exposed to an upper surface of the support substrate of the touch panel through a connection hole in the support substrate of the touch panel; and
    attaching the touch panel to the lower substrate and forming a connection line to electrically connect the OLED array and the touch panel through an exposed portion of the routing line.

11. The method according to claim 10, wherein forming a touch panel further includes:
    forming a bridge electrode on the support substrate;
    forming a first insulating film so as to cover the bridge electrode;
    forming the first sensor electrode on the first insulating film and electrically connected to a portion of the bridge electrode, the portion being exposed by selectively removing the first insulating film, and the second sensor electrode on the first insulating film so as to cross the first sensor electrode; and
    forming a second insulating film so as to cover the second sensor electrode.

12. The method according to claim 11, wherein the bridge electrode is formed of a transparent conductive material.

13. The method according to claim 10, further comprising connecting the connection line to a flexible printed circuit board (FPCB) on the lower substrate that is electrically connected to the OLED array.

14. The method according to claim 13, wherein the FPCB is electrically connected to a driver IC that is formed on the lower substrate and electrically connected to the OLED array.

15. The method according to claim 10, wherein the connection line includes at least one metal selected from among silver (Ag), magnesium (Mg), aluminum (Al), platinum (Pt), gold (Au), nickel (Ni), neodymium (Nd), iridium (Ir), chromium (Cr), and copper (Cu).

16. The method according to claim 10, further comprising forming a passivation film attached to the upper surface of the touch panel so as to cover a region in which the connection line and the routing line are electrically connected to each other.

17. The method according to claim 10, wherein the exposed portion of the routing line is formed of a transparent conductive material.

18. The method according to claim 17, wherein the routing line includes a first line formed of a low-resistance metal and a second line formed of the transparent conductive material.

* * * * *